(12) United States Patent
Mahadevan et al.

(10) Patent No.: US 9,996,546 B2
(45) Date of Patent: *Jun. 12, 2018

(54) SYSTEMS AND METHODS FOR AUTOMATICALLY DISSEMINATING CONTENT BASED ON CONTEXTUAL INFORMATION

(71) Applicant: Cisco Technology, Inc., San Jose, CA (US)

(72) Inventors: Priya Mahadevan, Sunnyvale, CA (US); Rebecca Lynn Braynard Silberstein, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/674,869

(22) Filed: Aug. 11, 2017

(65) Prior Publication Data
US 2017/0364532 A1    Dec. 21, 2017

Related U.S. Application Data

(63) Continuation of application No. 13/585,636, filed on Aug. 14, 2012, now Pat. No. 9,767,114.

(51) Int. Cl.
*H04L 29/06* (2006.01)
*G06F 17/30* (2006.01)

(52) U.S. Cl.
CPC .............................. *G06F 17/30165* (2013.01)

(58) Field of Classification Search
CPC .................................................. G06F 17/30165
See application file for complete search history.

(56) References Cited

U.S. PATENT DOCUMENTS

| | | |
|---|---|---|
| 2009/0022154 A1 | 1/2009 | Kiribe et al. |
| 2009/0287835 A1 | 11/2009 | Jacobson |
| 2010/0005061 A1 | 1/2010 | Basco et al. |
| 2010/0180332 A1 | 7/2010 | Ben-Yochanan et al. |
| 2011/0145858 A1 | 6/2011 | Philpott et al. |
| 2013/0073552 A1 | 3/2013 | Rangwala et al. |
| 2014/0053228 A1 | 2/2014 | Mahadevan et al. |

*Primary Examiner* — Ghodrat Jamshidi
(74) *Attorney, Agent, or Firm* — Edell, Shapiro & Finnan, LLC

(57) ABSTRACT

A content-dissemination system distributes, publishes, or makes available a content item to one or more target entities based on contextual information associated with the content item. When a user creates a new content item or the system detects a new content item for a local user, the system determines contextual information for the content item, and uses this contextual and previous historical contextual information to generate a set of structured names for the content item. The system also determines security and privacy policies for disseminating the content item from the determined contextual information and the historical contextual information. The system associates the set of structured names and the security and privacy policies with the content item, and can disseminate the content item to one or more target entities based on these structured names, the security and privacy policies, and the requirements and capabilities of the recipients.

20 Claims, 7 Drawing Sheets

UI 500

DISSEMINATION PLAN 502

Project Alpha Design Specifications.doc

| | Entity Name | Service | Account Name | Privacy Policy | Security Policy |
|---|---|---|---|---|---|
| ☒ | John Doe | E-mail | jdoe@parc.com | NA | Encrypted |
| ☒ | Jane Smith | Publish | /parc/users/jsmith/ | Private | Encrypted |
| ☒ | PARC Grp. Mgr. | Publish | /parc/projects/alpha/ | Private | Encrypted |

512   508   510

[+]  [Approve]  [Cancel]

DISSEMINATION PLAN 552

Project Alpha Group Photo.jpg

554

| | Entity Name | Service | Account Name | Privacy Policy | Security Policy |
|---|---|---|---|---|---|
| ☒ | John Doe | E-mail | jdoe@parc.com | NA | Encrypted |
| ☒ | Jane Smith | Publish | /parc/users/jsmith/ | Private | Encrypted |
| ☒ | PARC Grp. Mgr. | Publish | /parc/projects/alpha/ | Private | Encrypted |
| ☒ | Many | Facebook | Me | Friends Only | Restricted |
| ☒ | Many | Twitter | Me | Friends Only | Restricted |

[+]  [Approve]  [Cancel]

SYSTEMS AND METHODS FOR AUTOMATICALLY DISSEMINATING CONTENT BASED ON CONTEXTUAL INFORMATION

CROSS REFERENCE TO RELATED APPLICATIONS

This application is a continuation of U.S. patent application Ser. No. 13/585,636, filed Aug. 14, 2012, entitled "System and Methods for Automatically Disseminating Content Based on Contextual Information," the entire contents of which are hereby incorporated by reference.

BACKGROUND

This disclosure is generally related to automatic content distribution. More specifically, this disclosure is related to determining how to disseminate content based on contextual information extracted from at least the content, from a user's personal computing device, and/or from any computing or storage device accessible by the user's personal computing device.

RELATED ART

Advances in personal computing technologies have made it easier for people to share data with others. For example, when a user collaborates with others to create a document, the user may send updated drafts of the document to others via email, or the user may store the document on a server from which others can retrieve the document. As another example, the user can share pictures or other information related to his current activity by posting a status update on a social-media web service (e.g., a micro-blogging website or an online social network). By posting this information on the social-media web service, the user is allowing others to view his content at their leisure.

However, the task of sharing content with various people can become complicated if the user typically interacts with different people using different technologies. It may be the case that the user shares his personal life with close friends and family over one or more social-media channels, but not all of the user's contacts may have access to view (or may not be aware of) these social-media channels. To make matters worse, the user may know an email address for only some people in his close social circle, and may rely on other communication channels to communicate with the rest (e.g., in-person, via a chat client, via telephone, or via a short messaging service (SMS)). In this situation, the user may have to take the time to determine how he can communicate with each target recipient, and may need to send the content to them by using different technologies for different recipients.

SUMMARY

One embodiment provides a system that disseminates a content item to one or more target entities based on contextual information associated with the content item. During operation, when a local user generates a content item, the system determines contextual information for the content item. The system uses this contextual information to generate a set of structured names for the content item, and associates the set of structured names with the content item. A respective structured name can correspond to a target storage location for the content item, a service or technology for sharing the content item, etc.

In some embodiments, the system can determine the contextual information by extracting contextual information from the content item, determining recent contextual information for the local user, and/or determining historical contextual information associated with the local user.

In some embodiments, the system can disseminate the content item by determining a target entity for the content item based on the contextual information, and determines a dissemination method, a security policy, and a privacy policy for communicating with the target entity. The system then provides the content item to the target entity based on the dissemination method, the security policy, and the privacy policy for the target entity.

In some embodiments, the system can provide the dissemination plan to the local user. The dissemination plan can indicate one or more target entities, their corresponding dissemination methods, their corresponding security policies, and/or their corresponding privacy policies. The system can also receive a response to the dissemination plan from the local user. Then, in response to determining from the response that the local user accepts the dissemination plan, the system provides the content item to the target entities.

In some embodiments, the response from the user can indicate a target entity to remove from the dissemination plan, a target entity to add to the dissemination plan, a security policy for a target entity of the dissemination plan, a privacy policy for a target entity of the dissemination plan, and/or a user-confirmation indicating that the local user accepts the dissemination plan.

In some embodiments, the system determines the target entity by determining one or more historical contexts that match the contextual information for the local user, and determining a target entity which has received content during one or more of the historical contexts.

In some embodiments, the system determines the target entity by determining a set of capabilities of the target entity, such that a respective capability indicates at least one or more data types compatible with the target entity. The system then selects the target entity if the system determines that the content item is compatible with at least one of the determined set of capabilities of the target entity.

In some embodiments, the system provides the content item to the target entity by determining a dissemination method for the target entity. The dissemination method can include a storage location, such as a location within a local data storage, at a network based storage service or an Internet-based storage service, and/or within a shared data collection. The dissemination method can also include a service for communicating information to a specific destination, such as an email address, a peer-to-peer network connection, a simple messaging service (SMS) number, and a telephone number. Further, the dissemination method can include a method for broadcasting information to a plurality of target entities, such as via a data-sharing service (e.g., a video-sharing website), an online social network, a social-media service, or any data-dissemination service now known or later developed.

BRIEF DESCRIPTION OF THE FIGURES

FIG. 5A illustrates an exemplary user interface for presenting a dissemination plan to the local user in accordance with an embodiment.

FIG. 5B illustrates an exemplary user interface for presenting a dissemination plan to the local user in accordance with an embodiment.

In the figures, like reference numerals refer to the same figure elements.

DETAILED DESCRIPTION

Figure 1:
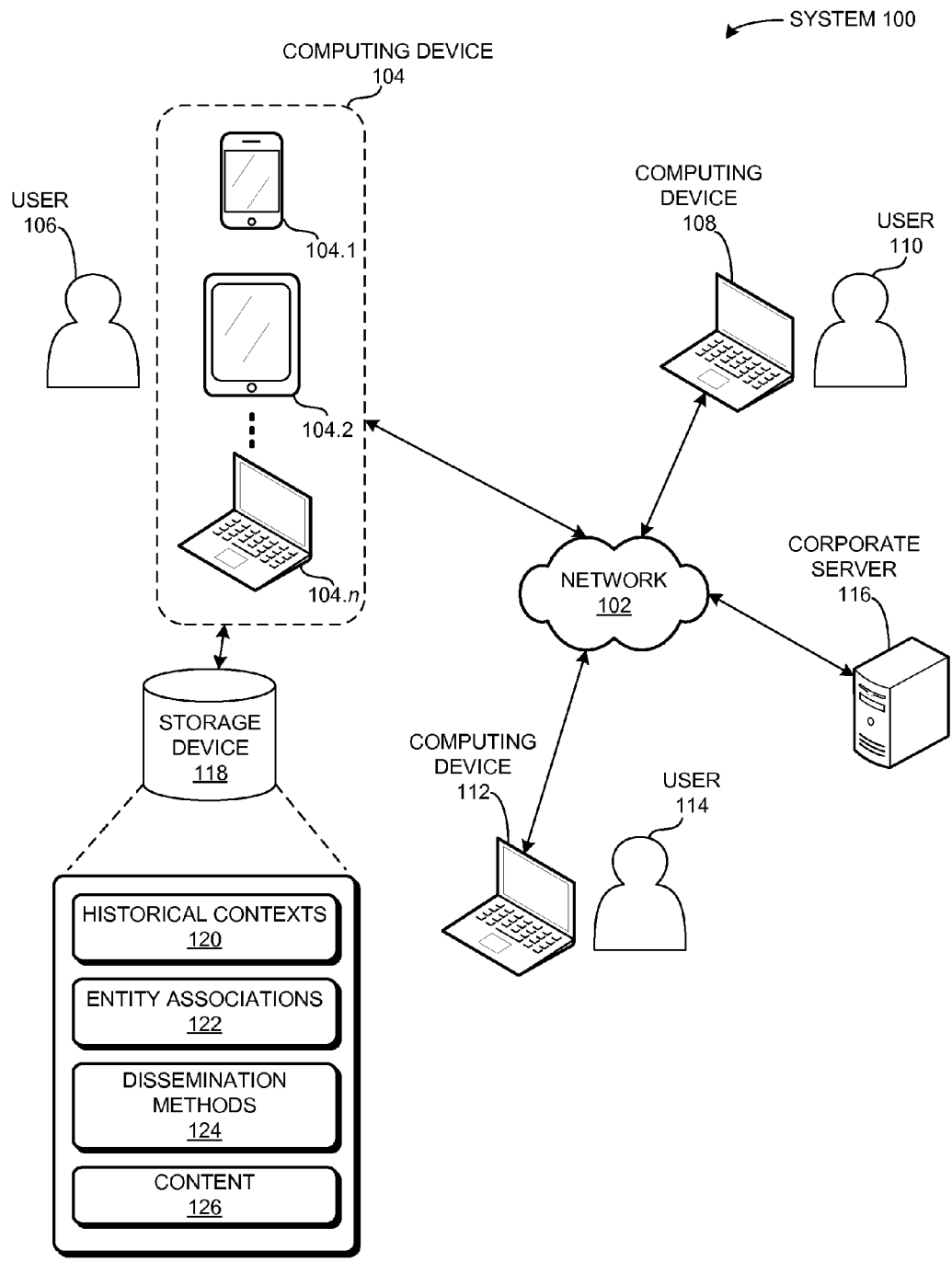
FIG. 1 illustrates an exemplary computer system that disseminates a content item by deriving a name from related contextual information in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a content-dissemination system that solves the problem of automatically disseminating content to a plurality of target entities via various dissemination methods. For example, computer users oftentimes create content in collaboration with others, or wish to share content with others. A member of a collaborative team may send a latest version of a document to other members of a team via email. Further, a user that takes a picture with others, either while in a social event (e.g., during family time) or within a work environment, may wish to share the picture with others via an online social-media service (e.g., a social network). The content-dissemination system can automatically determine to whom the user wants to distribute content, and via which dissemination methods, based on contextual information associated with the content. The system can also use the contextual information and the dissemination methods to determine if a security and/or privacy policy is appropriate or required.

In some embodiments, the system can derive a set of names for the content item using the contextual information. Each derived name can be comprised of a set of components that indicate pieces of information that can be used to disseminate the content item, such as a domain for sharing the content (e.g., a data collection or dissemination method such as email), as well as other information related to a target recipient and/or the content item. The system can combine these name components to generate a unique structured name for the content item (e.g., generate the structured name "/parc/home/ccn/test.txt" from the components "parc," "home," "ccn," and "test.txt"), to generate a hash-based name (e.g., by computing a hash value from the name components), or to generate a name using any other content-naming technique now known or later developed.

If the derived name is for a communication service (e.g., an email or a social-media service), the system can derive the name so that it indicates how this service is to be configured for sharing the content item. The domain may be associated with certain security and privacy policies, and the other terms of the derived name may indicate an account name for the target recipient and/or contextual information related to the content item.

As an example, the system can disseminate content using content-centric networking (CCN). In CCN, all content is named, and each piece of content is uniquely bound to its structured name. Multiple names can be securely bound to a piece of content through the use of CCN Links, and multiple content objects can be considered a collection based on a namespace and the published content. If the derived name is for a data collection, the system can generate a structured name that adds the content item to a corresponding data collection of a CCN-based system. A description of a CCN is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference. When the system derives structured names for the content item, the system binds the meaningful name to the content (along with additional information) to form a content object that can satisfy various interests from other nodes in the network. For example, these structured names allow other entities to obtain the content item via CCN, and to add the content item to their local data collection.

In a CCN, content objects are "persistent," which means that the content item can move around within a computing device, or across different computing devices, but does not change. If any component of the content object changes, the entity that made the change creates the updated content, additional information or the name, and/or a new content object, and signs the new content (e.g., to bind a new name to the content). A structured name can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" of "/parc/home/ccn/test.txt." Additional components can be used to distinguish between different versions of the content item, such as a collaborative document. These additional naming components are not the focus of this invention. The naming scheme can be modeled as a forest of trees, and there is no single "root" for the naming scheme. The system can create a set of structured names for the content item to create "links" between the content item and other sets of names for other content items. In CCN, these links are also content objects that securely bind names to existing or future content objects. Additional naming structures can also be developed, for example, a content object can be created that contains a list of names linking to other content objects.

Because of this naming convention, the content item can be addressed, located, retrieved, cached, and disseminated by its structured name(s). Any computing device in a computer network can generate an interest to obtain the content from any device that has a content item whose structured name satisfies the interest. Since the content objects are persistent, any change to the content will result in a new name. The new name can be automatically generated as a version of the original name, can be associated with authentication metadata (e.g., a digital signature by the publisher of the content), or can reflect the nature of the content change.

In sum, the system can generate a set of names for a content item based on contextual information, and then associates these derived names with the content item. A name can be a persistent structured name, a hash-based name, or any other type of name now known or later developed. The name can also be represented in a naming convention such as a location in a file-system. A name can configure the system to disseminate the content item via an Internet service (e.g., an email service, a social media web service, a data-sharing web service, etc.), or to disseminate the content item across an information-centric networking (ICN) network such as CCN or any other named-data networking (NDN) network now known or later developed.

FIG. 1 illustrates an exemplary computer system 100 that disseminates a content item by deriving a name from related contextual information in accordance with an embodiment. Computer system 100 can include a computer network 102, and a computing device 104 that disseminates content via network 102. Computer network 102 can include any wired or wireless network that interfaces various computing devices to each other, such as a computer network implemented via one or more technologies (e.g., Bluetooth, Wi-Fi, cellular, Ethernet, fiber-optic, etc.). Computing device 104 can include any computing device that a user 106 can use to create content, and to share the content with others. For example, computing device can include a smartphone 104.1, a tablet computer 104.2, or any other personal computing device 104.n such as a laptop, a camera, a video recorder, etc.

When user 106 creates, receives, or determines the existence of new content at a peripheral device, computing device 104 can determine other entities with whom user 106 may wish to share the content. Computing device 104 may determine recent contextual information related to the user or the content, and can determine one or more target entities for the content by comparing this information to past contextual and activity information related to how user 106 has shared content in the past or from explicit input by user 106 or applications running on computing device 104. For example, user 106 may oftentimes work on projects with users 110 and 114. When user 106 creates content that includes the phrase "Project Alpha," or while in the vicinity of users 110 and 116, user 106 may oftentimes decide to share the content with users 110 and 116, and to make the content available to their employer (e.g., by sending the content to a corporate server 116 that includes a document repository or versioning system, a distribution list, etc.). Computing device 104 can store this contextual and content-dissemination information for future use. Then, in the future, when the system detects a similar context for user 104 and detects a new piece of content (e.g., user 106 creates content that includes the phrase "Project Alpha," or is in the vicinity of users 110 and 116), the system may ask user 106 if he wishes to make the new content available to users 110, 114, and corporate server 116, or a subset thereof. The system does not need to undergo a training phase to determine how to disseminate content, but can use historical or training data to increase effectiveness to user 106.

In some embodiments, computing device 104 can include or be coupled to a storage device 118, which can store content 126 created by user 106 or by any other entity, and can store historical contexts 120 that are associated with user 106 or content 126. Computing device 104 can add contextual information to historical contexts 120 either periodically (e.g., to record a location trace for user 106), or when user 106 performs an action associated with a piece of content (e.g., when user 106 creates, opens, updates, shares, or deletes a piece of content, or gains access to a remote device that includes the piece of content or a collection of content such as a data stream or content aggregation). The contextual information can include any information related to user 106, content 126, and/or an operation that user 106 performs on content 126. Storage device 118 can also store entity associations 122 that indicate contact information to a plurality of entities, and can indicate how user 106 is associated with each of these entities (e.g., relationship type, shared group associations, etc.). Further, storage device 118 can store a record of dissemination methods 124 for disseminating content 126 to other entities.

In some embodiments, computing device 104 can periodically monitor one or more local sensors to collect contextual information about the local user, such as the user's location and/or a motion trajectory for user 106. Examples of information include, but are not limited to: GPS coordinates, location details for calendar entries, travel data, social network location updates, etc. Computing device 104 can also monitor signals from other devices (e.g., Bluetooth, WiFi, and/or RFID signals) to collect contextual information about the surroundings to user 106, such as other entities that user 106 is interacting with. For example, computing device 104 can identify other nearby individuals (e.g., via a Bluetooth signal from a person's smartphone) or devices (e.g., via an RFID or Bluetooth signal emitted by the user's car). The contextual information can indicate the name of the entity being monitored, a timestamp or time range, and/or a location.

In some embodiments, computing device 104 can monitor electronic activities associated with user 106 to collect contextual information that indicates other remote entities that user 106 is interacting with, such as by detecting online communication activities with a remote entity (e.g., via an online chat client, a teleconference session, a videoconference session), a network connection with a remote entity (e.g., a virtual private network (VPN) connection to the user's employer), etc. Computing device 104 can also collect contextual information from electronic media that user 106 interacts with, such as documents, multimedia content, applications, websites, etc. The contextual information can indicate the name of the electronic media, a timestamp or time range, and/or access information for the electronic media (e.g., a storage location, a website address, a software application used to access the content, etc.).

In some embodiments, content 126 can include a collection of data (e.g., a CCN collection), which can include content items created by user 106 or other entities. Further, storage device 118 can also include dissemination methods 124, which computing device 104 can use to share content 126 with one or more remote entities. For example, dissemination methods 124 can include contact information for entities within a social network for user 106 (e.g., an email address), a structured name for a CCN data collection, an account name for an online social media service (e.g., account names or identifiers for Facebook, Twitter, Picasa, etc.). Further, dissemination methods 124 can include software technologies for disseminating content to the target entities, such as an email client, and a collection-synchronization system that can synchronize CCN data collections between multiple computing devices. As another example, dissemination methods 124 can also include web-based technologies, such as an application programming interface (API) for interacting directly with a website such as a social media service (e.g., Google's calendar and docs APIs, the Twitter API, and Facebook's Graph API or Facebook Query Language (FQL)). Dissemination methods 124 can also include any other content-disseminating techniques now known or later developed.

Automated Content Dissemination

Figure 2:
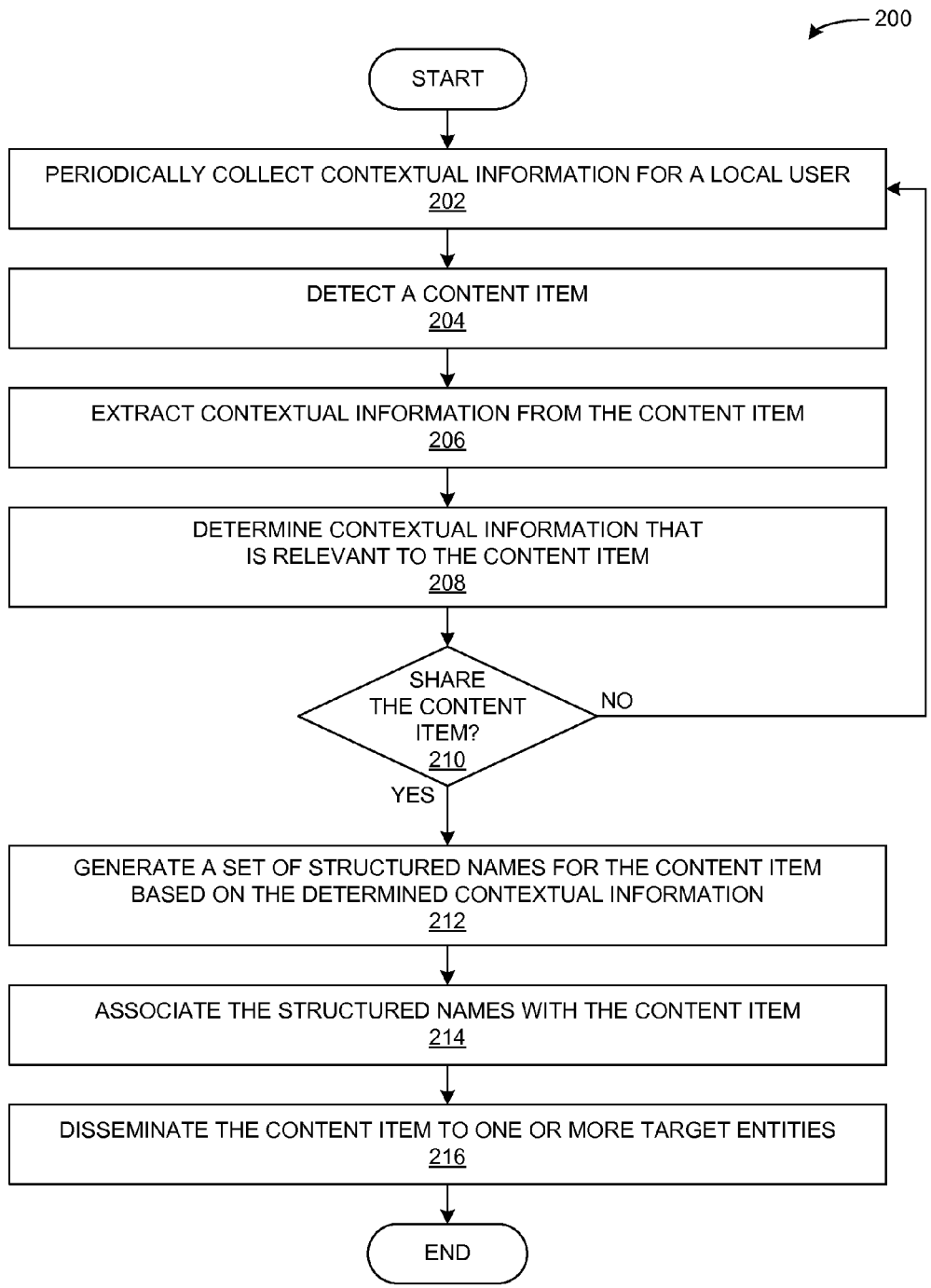
FIG. 2 presents a flow chart illustrating a method for disseminating a content item to one or more target entities in accordance with an embodiment.

FIG. 2 presents a flow chart illustrating a method 200 for disseminating a content item to one or more target entities in accordance with an embodiment. During operation, the system may periodically collect contextual information for the local user (operation 202), or alternatively collect the contextual information at the time of content creation. The contextual information can indicate information about the local user (e.g., location, activity, etc.), other individuals, other nearby devices, and/or any other information about the user's environment. The system can store these contextual information snapshots to generate historical context information. Each historical snapshot can indicate at least the name of the entity that was detected or monitored, a timestamp or time range, a location for the local user during this time, and/or any information collected during this time. The system can collect the contextual information from a local computing device, from signals within an environment around the user's device (e.g., a service set identifier (SSID) of a Wi-Fi network), and/or from a device accessible by the local computing device.

When the system detects a content item (operation 204), the system can extract contextual information from the content item (operation 206) and determines contextual information (from the historical and the extracted contextual information) that can be used to determine how to share the content item (operation 208). During operation 204, the system may detect the content item when the user creates or otherwise accesses the content item, or when the system gains access to a device that stores the content item (e.g., gains access to a portable storage drive, a network storage drive, a digital camera, or any remote computing device that stores the content item). The extracted contextual information can indicate any information from the content item that can be used to determine target entities for the content item. In some embodiments, the system can extract names (e.g., of a person, a business, a project, an object, etc.), activities, dates, locations, and/or any other relevant information from the content item. The system can also determine data-protection related information, such as privacy and security policies or requirements for the content-dissemination methods.

The system then determines whether the user may wish to share the content item (operation 210). For example, the system can compare the determined contextual information to a plurality of historical contexts, or to a plurality of content items that the user has shared in the past. If the user has shared other similar content under a similar context in the past, the system can determine that the user may to want to share the content item to the same target entities. As another example, the user can create a set of rules which indicate criteria for determining whether a certain content item is to be shared, and which indicate how this content item is to be shared. Alternatively, the user can explicitly indicate that the user wants to share the content item (e.g., by selecting a menu option within a graphical user interface provided by the system). The system can analyze the situations that the user explicitly instructs the system to share a content item (e.g., by analyzing the content item and the contextual information) to generate and/or update the set of rules.

If the system is not to share the content item, the system can return to operation 202 to periodically collect contextual information related to the local user, or can wait until other content is detected (e.g., created or modified). The system can also prompt the user, or default to a predefined operation, to save the content with a generic name in a default location of the system or application. Otherwise, the system proceeds to generate a set of structured names for the content item based on the determined contextual information (operation 212), and associates the structured names with the content item (operation 214). The system can determine a set of target entities to distribute the content item, and generates a structured name which indicates a dissemination method for each target entity. The system then disseminates the content item to the one or more target entities based on the structured names (operation 216).

In some embodiments, the system can also disseminate the extracted contextual information. The system can generate a set of derived names for the contextual information, and can create a piece of content that includes the contextual information and the derived names. This additional contextual information can also be used to automatically populate metadata properties as defined by operating system or application convention. This piece of content associates the set of derived names with the contextual information, which facilitates disseminating the contextual information. For example, for a photograph that is stored in a network-based file system, the contextual information might be stored in a file system along with the photograph using the file system conventions for hierarchical names by creating or adding to directories in the local and/or remote storage structure. Applications built on this file system can use the contextual information tags to search for this photograph and/or any other related photographs (e.g., by deriving the photograph's structured name from the contextual information).

The system can also access a shared context repository to obtain relevant contextual information. The shared context repository may be a database or other information source that is accessible by computing devices that satisfy certain criteria (e.g., devices that provide relevant authorization information, or provide relevant contextual information such as a location identifier). The shared context repository may include a fixed repository that is associated with a given location identifier or a given subject (e.g., an activity), or may include a repository from a nearby user's personal computing device (e.g., a peer device for a participant of an activity).

For example, a user sitting in a conference room with a laptop (or any other computing device) may create a meeting-notes document while in the conference room. When the user turns on the laptop or launches a certain application (e.g., a word processor), the laptop may access the shared context repository (e.g., a room-scheduling system or company calendar system) to obtain contextual information about the conference room, and uses this information to derive names for the content item. The user's laptop may also add contextual information about the user to this shared context repository for the other participants in the conference room. The other participants' personal computing devices can also add their respective contextual information to the shared context repository, and can obtain contextual information from this repository to derive names for other pieces of content.

In some embodiments, a derived name can include a structured name that indicates how to distribute a content item via a data collection (e.g., a collection of data to which a target entity is subscribed), via email, via a social-media service, or via any other content-dissemination method. For example, if a target entity established a CCN namespace "/parc/ProjectAlpha/" for an application or computing device, the system can add an image "picture.jpg" to the collection by assigning the structured name "/parc/ProjectAlpha/picture.jpg" to the content item.

As another example, if the system is to distribute the content item to a target entity named John Doe via an email address "jdoe@parc.com," the system can assign the structured name "/parc.com/email/jdoe/picturejpg" to the content item. Further, if the system is to distribute the content item to the local user's friends via an online social network, such as Facebook, the system may generate the structured name "/Facebook/userID/groups/friends/picturejpg" to the content item. The parent name of each structured name (e.g., "/Facebook/userID/groups/friends/") is associated with a privacy policy and a security policy that the system enforces while disseminating the content item via the corresponding dissemination method (e.g., via a Facebook API implementation).

In some embodiments, the system can search through a set of entities associated with the local user to determine a set of target entities that may need to receive the content item. The system can compare a set of known entities with the contextual information to determine whether a known association between an entity and the local user (e.g., a historical context shared between the entity and the local user) matches the content item's contextual information.

Figure 3:
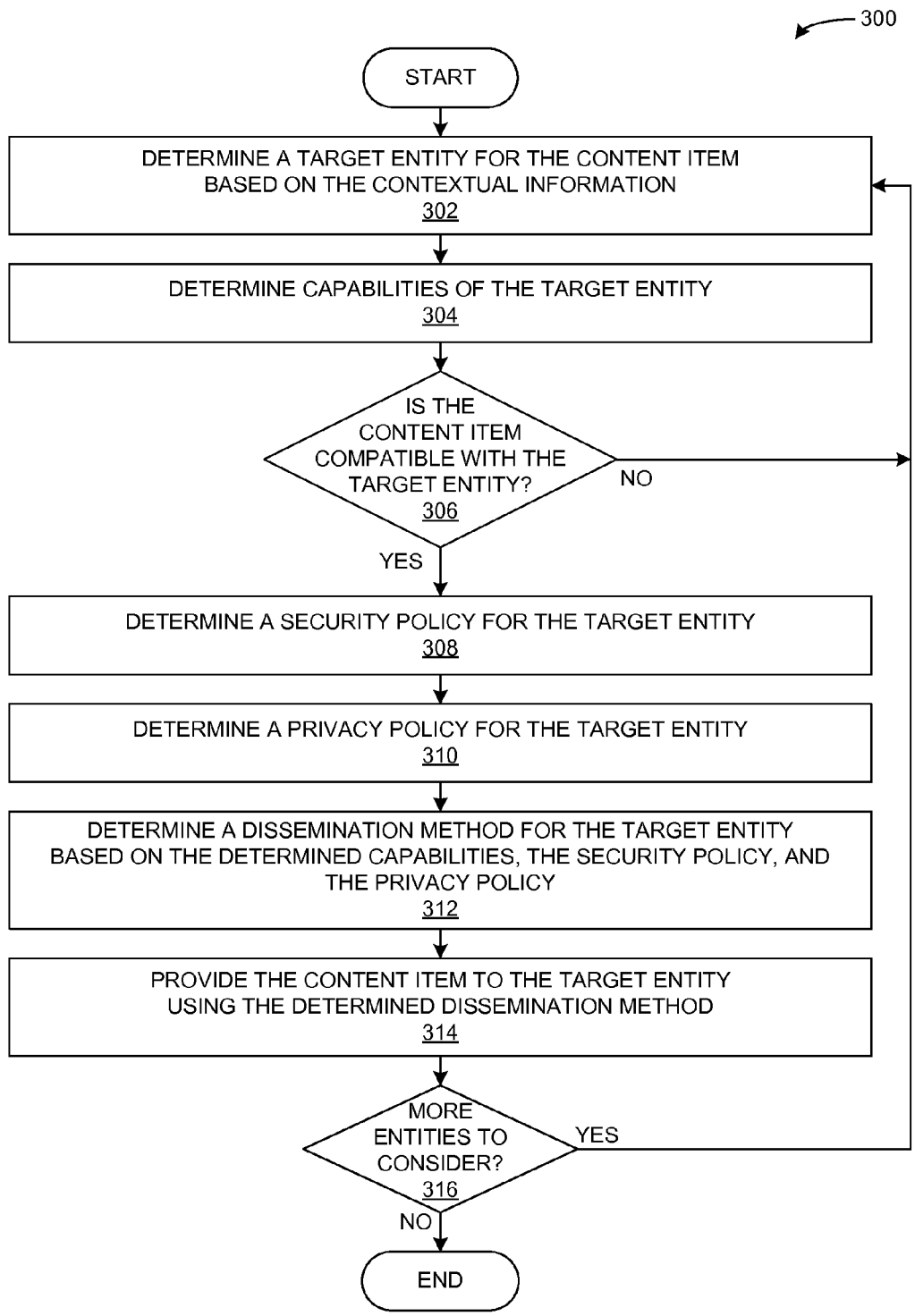
FIG. 3 presents a flow chart illustrating a method for determining and using a dissemination method to provide a content item to a target entity in accordance with an embodiment.

FIG. 3 presents a flow chart illustrating a method 300 for determining a dissemination method to provide a content item to a target entity in accordance with an embodiment. During operation, the system determines a target entity for the content item based on the contextual information (operation 302), and determines one or more capabilities of the target entity (operation 304). For example, the target entity may include a computing device (e.g., a smartphone), and the capabilities can indicate a physical characteristic of the computing device (e.g., screen dimensions, a pixel density, processor type and speed, etc.), or a software capability of the computing device (e.g., a set of file types that the computing device can display). As another example, the target entity can include a social-media service (e.g., Facebook or Twitter), and the capabilities indicate a set of file types that can be shared via the social-media service (e.g., video files, images, and plain text).

The system determines whether the content item is compatible with the target entity (operation 306). If the target entity is not able to access the content item, the system returns to operation 302 to determine another target entity for the content item. Otherwise, the system determines a security policy for the target entity (operation 308), and determines a privacy policy for the target entity (operation 310). The system also determines a dissemination method for the target entity based on the determined capabilities, the security policy, and the privacy policy (operation 312). The dissemination method can indicate a service or technology for disseminating the content item (e.g., via email, via a CCN collection, or via a social-media service), an account name for the service or technology (e.g., an email address), and the privacy and security policies that are to be enforced by the dissemination method.

The system then provides the content item to the target entity using the determined dissemination method (operation 314). The system also determines whether there are more entities to consider (operation 316). If so, the system can return to operation 302 to determine another target entity that may need to receive the content item. In some embodiments, the ordering of the operations of method 300 can vary, and some operations may not be required.

Figure 4:
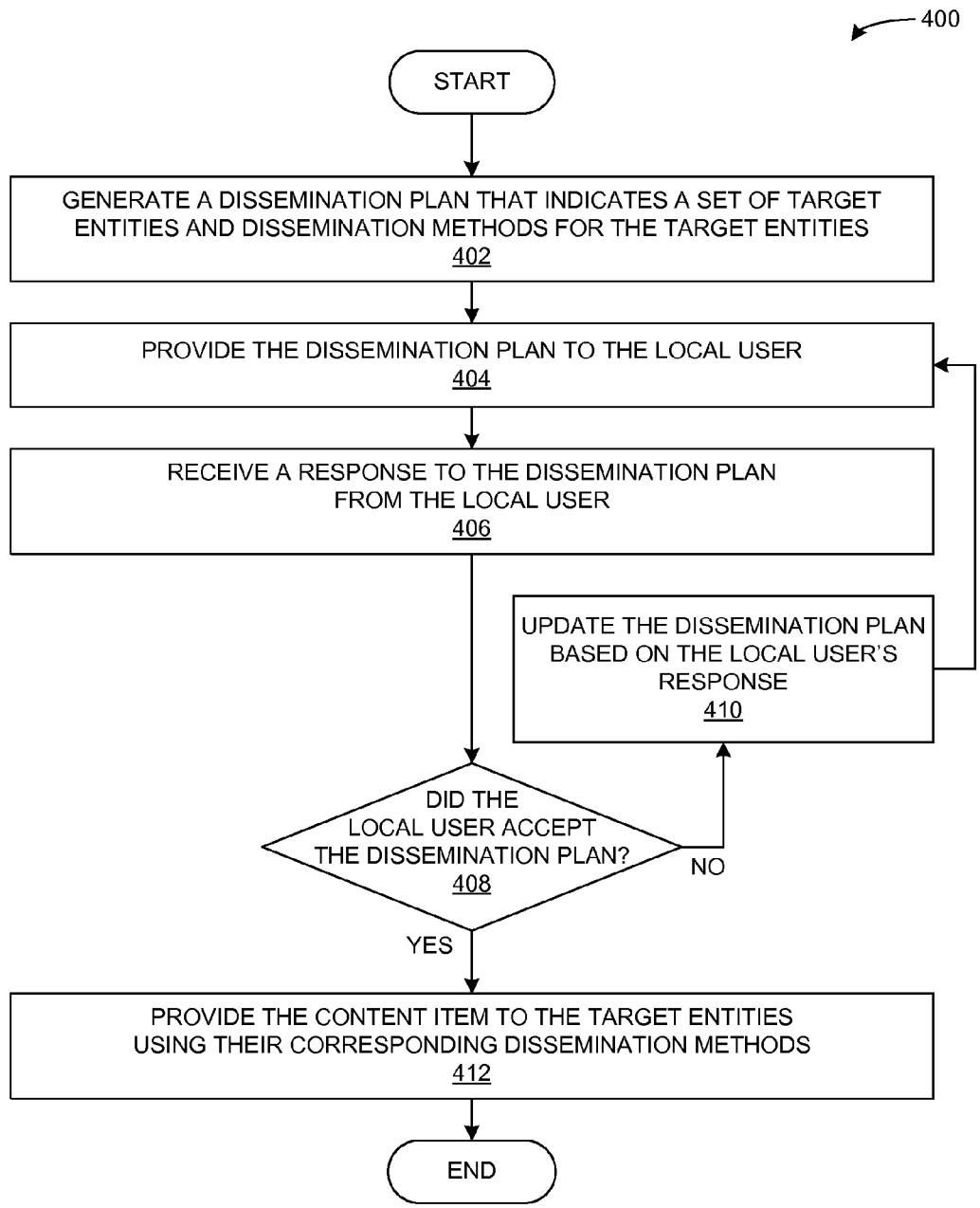
FIG. 4 presents a flow chart illustrating a method for providing a dissemination plan to a local user in accordance with an embodiment.

FIG. 4 presents a flow chart illustrating a method 400 for providing a dissemination plan to a local user in accordance with an embodiment. During operation, the system generates a dissemination plan that indicates a set of target entities and dissemination methods for the target entities (operation 402), and provides the dissemination plan to the local user (operation 404).

When the system receives a response to the dissemination plan from the local user (operation 406), the system determines whether the local user accepted the dissemination plan (operation 408). If the local user did not accept the dissemination plan, the system can update the dissemination plan based on the local user's response (operation 410), and returns to operation 404 to provide the updated dissemination plan to the local user. For example, the response from the user can indicate a target entity to add to or remove from the dissemination plan, or can indicate a change to a security policy or privacy policy for a target entity of the dissemination plan. The system can update the response plan to incorporate the user's response.

In some embodiments, when the system generates or updates the dissemination plan, the system ensures that a conflict does not exist in security or privacy policies between the dissemination methods for the various target entities. For example, if the system predicts the user may want to share a link to a file with colleagues via an online social network (e.g., based on past sharing behavior), but the local user responds by modifying the plan to also save the file locally using a strict privacy setting. When the system receives the user's response, the system may modify the privacy setting for posting the file on the online social network so that only a strict group of colleagues can view the file. Alternatively, the system may modify the dissemination plan to send the file directly to the individuals in the group (e.g., either via the online social network, or any other method) using the same strict privacy setting that the local user had set for saving the file. Once the local user accepts the dissemination plan, the system can proceed to provide the content item to the target entities using their corresponding dissemination methods (operation 412).

For example, the user may collaborate with other members of a project named "Alpha" to create a document "Project Alpha Design Specification.doc." The system determines two other members of the design team, John Doe and Jane Smith, and creates a dissemination plan that includes dissemination methods that the user has used to share content with them in the past. The user may update the dissemination plan to add an entry for the team's group manager, and to ensure that the content is disseminated under a "Private" privacy policy, and to ensure that the content is disseminated in encrypted form. Once the user is satisfied with the dissemination plan, the user can click on an "Approve" button to accept the dissemination plan and instruct the system to execute the plan.

FIG. 5A illustrates an exemplary user interface 500 for presenting a dissemination plan to the local user in accordance with an embodiment. UI 500 can include a dissemination plan 502 for the document "Project Alpha Design Specification.doc," a user-confirmation button 504, a cancel button 506, and an add-entry button 514.

Dissemination plan 502 can indicate one or more target entities (e.g., entity 508), along with a dissemination method for each target entity (e.g., dissemination method 510). Each dissemination method can indicate a service or technology for disseminating the content item, an account name for the service or technology, and the privacy and security policies that are to be enforced by the dissemination method. The user can remove an entry from dissemination plan 502 by using an input device (e.g., a mouse pointer or a touchscreen interface) to click on a corresponding remove button (e.g., remove button 512). Further, the user can add an entry to dissemination plan 502 by using the input device to click on add-entry button 514.

The system can proceed to disseminate the content item as proposed by dissemination plan 502 once the user clicks on user-confirmation button 504. However, if the user clicks on cancel button 506, the system may proceed to perform a remedial action, such to present the user with another UI which asks the user whether the system is to save the content item in a local repository or file system, or to delete the content, and/or a UI which asks the user where in the local repository or file system the system should save the content item.

In some embodiments, if the local user generates a new content item while still in a context associated with dissemination plan 502 (e.g., the local user is still nearby to other members of the Project Alpha group, or the local user has not left a physical location associated with Project Alpha), the system can generate a new dissemination plan 552 for the content item based on dissemination plan 502. For example, the local user may take a photo of members of the Project Alpha group, and the system can automatically determine a set of entities to disseminate the group photo to based on prior communications to these other members, and based on how the local user has shared pictures in the past.

FIG. 5B illustrates an exemplary user interface 550 for presenting dissemination plan 552 to the local user in accordance with an embodiment. UI 550 can include dissemination plan 552 so that it includes one or more entries 554 derived from previous dissemination plans that match the local user's current contextual information (e.g., entries from dissemination plan 502). Entries 554 may use the same privacy and security policies from the previous dissemination plan, or may include other privacy and security policies that the system derives based on contextual information extracted from the content.

Dissemination plan 552 can also include one or more entries 556 that the system derives using contextual information from the group photo, such as dissemination methods that the local user may have used in the past to share pictures. Entries 556 may use the same privacy and security policies that the user may have used in the past to share this type of content, or may include other privacy and security policies that the system derives based on other entries of the dissemination plan (e.g., entries 554) or contextual information extracted from the content. In the example illustrated by UI 550, the system generates entries 556 to include a privacy policy that is compatible with entries 554 by setting the photo's privacy policy to "Friends Only" so that only the user's friends can view the picture. Further, the system generates entries 556 to include a security policy that is compatible with entries 554 by setting the security policy to "Restricted" so that the user's friends are restricted from sharing the photo with others.

Figure 6:
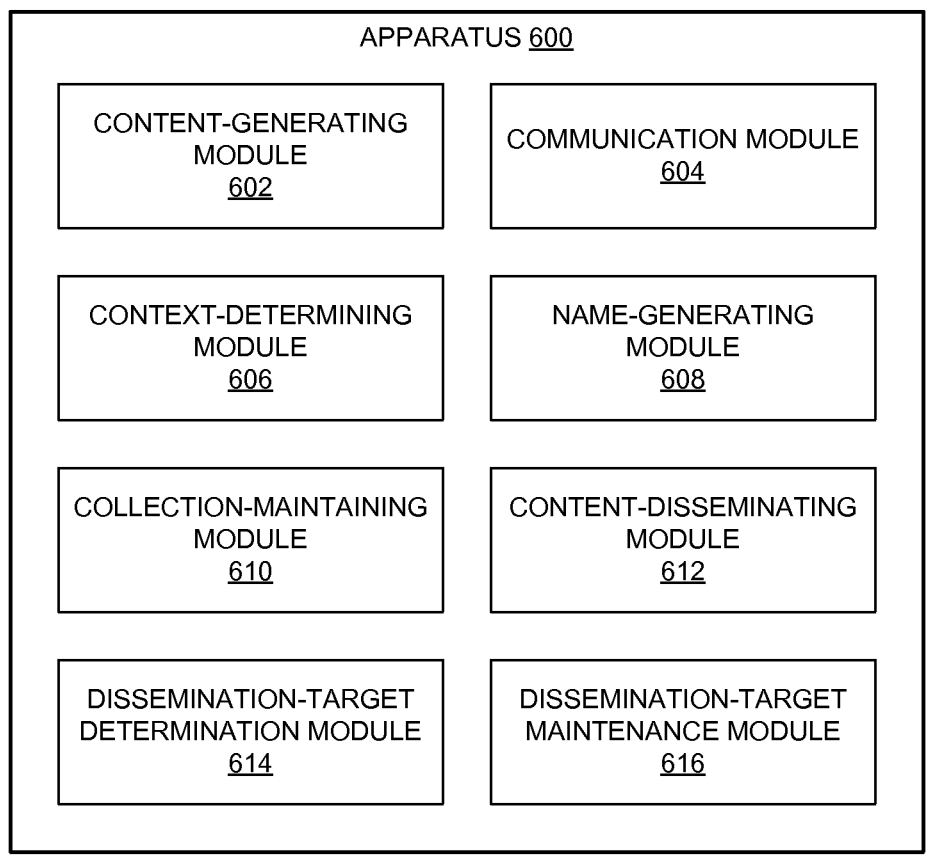
FIG. 6 illustrates an exemplary apparatus that facilitates disseminating a content item in accordance with an embodiment.

FIG. 6 illustrates an exemplary apparatus 600 that facilitates disseminating a content item in accordance with an embodiment. Apparatus 600 can comprise a plurality of modules which may communicate with one another via a wired or wireless communication channel or a combination thereof. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise content-detecting module 602, a communication module 604, a context-determining module 606, a name-generating module 608, a collection-maintaining module 610, a content-disseminating module 612, a dissemination-target determination module 614, and a dissemination-target maintenance module 616.

In some embodiments, content-detecting module 602 can detect a piece of content (e.g., content created by a local user, or content imported from or detected at a device accessible by apparatus 600), and communication module 604 can send the content to one or more target entities. Context-determining module 606 can determine contextual information for the content item, such as by extracting the contextual information from the content item itself, or by accessing the contextual information from a local repository or a shared context repository at a remote device. Name-generating module 608 can generate a set of structured names for the content item based on the contextual information.

Collection-maintaining module 610 can add the content item into a local collection, as well as other content items received from other entities. Content-disseminating module 612 can provide the content item to a target entity based on a security policy and a privacy policy for the target entity. Dissemination-target determination module 614 can determine one or more target entities to which the local user may wish to disseminate the content item (e.g., based on historical target entities related to the contextual information, or by detecting new target entities from the contextual information). Dissemination-target maintenance module 616 can update a collection of target entities that are associated with the contextual information, for example, to add a new target entity detected from the contextual information, or to remove a historical target entity that is no longer related to the contextual information.

Figure 7:
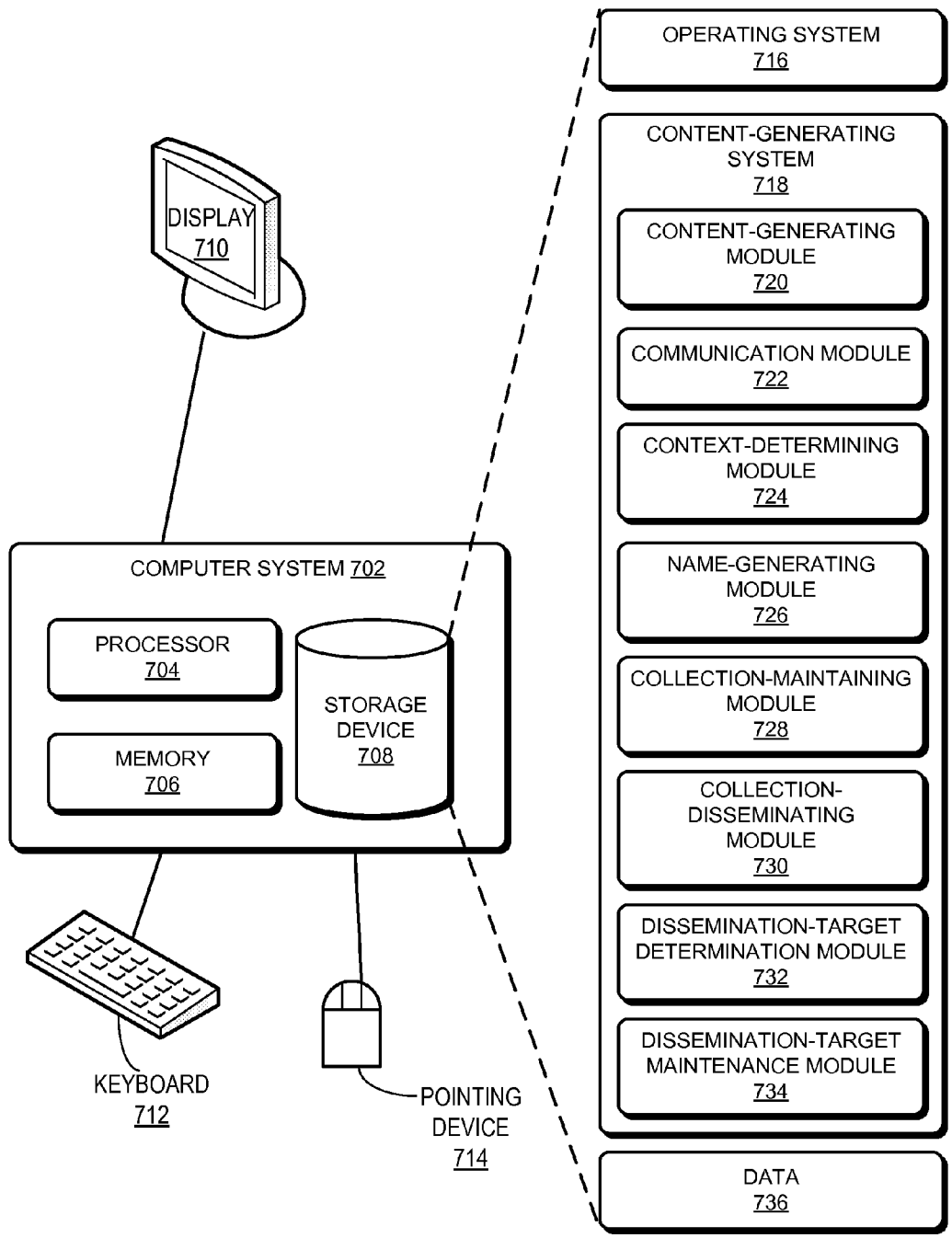
FIG. 7 illustrates an exemplary computer system that facilitates disseminating a content item in accordance with an embodiment.

FIG. 7 illustrates an exemplary computer system 702 that facilitates disseminating a content item in accordance with an embodiment. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store operating system 716, a content-generating system 718, and data 736.

Content-generating system 718 can include instructions, which when executed by computer system 702, can cause computer system 702 to perform methods and/or processes described in this disclosure. Specifically, content-generating system 718 may include instructions for generating content for a local user (content-generating module 720), and may include instructions for sending the content to one or more target entities (communication module 722). Content-generating system 718 can also include instructions for determining contextual information for the content item, such as by extracting the contextual information from the content item itself, or by accessing the contextual information from a local repository or a shared context repository at a remote device (context-determining module 724). Content-generating system 718 can also include instructions for generating a set of structured names for the content item based on the contextual information (name-generating module 726).

Content-generating system 718 can also include instructions for adding the content item into a local collection, as well as other content items received from other entities to the local collection (collection-maintaining module 728). Further, content-generating system 718 can include instructions for providing the content item to a target entity based on a security policy and a privacy policy for the target entity (collection-disseminating module 730).

Content-generating system 718 can also include instructions for determining one or more target entities to which the local user may wish to disseminate the content item (dissemination-target determination module 732). Further, content-generating system 718 can include instructions for updating a collection of target entities that are associated with the contextual information (dissemination-target maintenance module 734).

Data 736 can include any data that is required as input or that is generated as output by the methods and/or processes described in this disclosure. Specifically, data 736 can store at least historical contextual information for the local user, entity associations to other entities that the local user knows and/or communicates with, dissemination methods that the local uses to share information and data with other users, and data collections that can include one or more content items generated by the local user and/or other entities.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    detecting a content item accessed by a local user;
    determining contextual information for the content item, wherein the contextual information is associated with one or more of:
        an activity of the local user;
        a timestamp or time range for the activity;
        a location of the local user; and
        an electronic activity associated with the local user;
    determining a target entity for the content item based on the contextual information, wherein the target entity is a device or service associated with a user that is different from the local user;
    determining a security policy for the target entity;
    determining a privacy policy for the target entity; and
    providing the content item to the target entity based on the determined security policy and the privacy policy for the target entity.

2. The method of claim 1, wherein detecting the new content item involves one or more of:
    generating the content item at the computing device;
    receiving the content item at the computing device; or
    detecting the content item at a peripheral device accessible by the computing device.

3. The method of claim 1, wherein determining the contextual information involves one or more of:
    extracting contextual information from the content item;
    determining recent contextual information for the local user; or
    determining historical contextual information associated with the local user.

4. The method of claim 1, wherein providing the content item to the target entity involves:
    providing, to the local user, a dissemination plan that indicates one or more target entities;
    receiving a response from the local user to the dissemination plan; and
    responsive to determining from the response that the local user accepts the dissemination plan, providing the content item to the target entities.

5. The method of claim 4, wherein the response indicates one or more of:
    a target entity to remove from the dissemination plan;
    a target entity to add to the dissemination plan;
    a security policy for a target entity of the dissemination plan;
    a privacy policy for a target entity of the dissemination plan; or
    a user-confirmation indicating that the local user accepts the dissemination plan.

6. The method of claim 1, wherein determining the target entity involves:
    determining one or more historical contexts that matches the contextual information for the local user; and
    determining a target entity which has received content during one or more of the historical contexts.

7. The method of claim 1, wherein determining the target entity involves:
    determining a set of capabilities of the target entity, wherein a respective capability indicates at least one or more data types compatible with the target entity; and
    determining that the content item is compatible with at least one of the determined set of capabilities of the target entity.

8. The method of claim 1, wherein providing the content item to the target entity involves determining a dissemination method for the target entity; and
wherein the dissemination method includes one or more of:
an email address; a mailing distribution list;
a local data storage;
a network-based storage service;
an Internet-based storage service;
a shared data collection;
a data-sharing service;
a social-media service;
a peer-to-peer network connection;
a simple messaging service (SMS) number; or
a telephone number.

9. The method of claim 1, further comprising:
generating one or more structured names for the contextual information;
associating the generated structured names with the contextual information to facilitate disseminating the contextual information; and
disseminating the contextual information, which is associated with the content item, based on the generated structured names.

10. A non-transitory computer-readable storage medium storing instructions that when executed by a computer cause the computer to perform a method, the method comprising:
responsive to detecting a content item accessed by a local user, determining contextual information for the content item, wherein the contextual information is associated with one or more of:
an activity of the local user;
a timestamp or time range for the activity;
a location of the local user; and
an electronic activity associated with the local user;
determining a target entity for the content item based on the contextual information, wherein the target entity is a device or service associated with a user that is different from the local user;
determining a security policy for the target entity;
determining a privacy policy for the target entity; and
providing the content item to the target entity based on the determined security policy and the privacy policy for the target entity.

11. The non-transitory computer-readable storage medium of claim 10, wherein determining the contextual information involves one or more of:
extracting contextual information from the content item;
determining recent contextual information for the local user; or
determining historical contextual information associated with the local user.

12. The non-transitory computer-readable storage medium of claim 10, wherein the detecting the content item includes one or more of:
generating the content item at the computing device;
receiving the content item at the computing device; or
detecting the content item at a peripheral device accessible by the computing device.

13. The non-transitory computer-readable storage medium of claim 10, wherein providing the content item to the target entity includes:
providing, to the local user, a dissemination plan that indicates one or more target entities;
receiving a response from the local user to the dissemination plan; and
responsive to determining from the response that the local user accepts the dissemination plan, providing the content item to the target entities.

14. The non-transitory computer-readable storage medium of claim 13, wherein the response indicates one or more of:
a target entity to remove from the dissemination plan;
a target entity to add to the dissemination plan;
a security policy for a target entity of the dissemination plan;
a privacy policy for a target entity of the dissemination plan; or
a user-confirmation indicating that the local user accepts the dissemination plan.

15. The non-transitory computer-readable storage medium of claim 13, wherein providing the content item to the target entity involves determining a dissemination method for the target entity; and
wherein the dissemination method includes one or more of:
an email address; a local data storage;
a network-based storage service;
an Internet-based storage service;
a shared data collection;
a data-sharing service;
a social-media service;
a peer-to-peer network connection;
a simple messaging service (SMS) number; or
a telephone number.

16. The non-transitory computer-readable storage medium of claim 10, wherein determining the target entity involves:
determining one or more historical contexts that matches the contextual information for the local user; and
determining a target entity which has received content during one or more of the historical contexts.

17. An apparatus comprising: a memory; and
a processor configured to executed instructions stored in the memory to perform operations including:
detecting a content item accessed by a local user;
determining contextual information for a content item responsive to the detecting the content item, wherein the contextual information is associated with one or more of the following:
an activity of the local user;
a timestamp or time range for the activity;
a location of the local user; and
an electronic activity associated with the local user;
determining a target entity for the content item based on the contextual information, wherein the target entity is a device or service associated with a user that is different from the local user;
determining a security policy for the target entity;
determining a privacy policy for the target entity; and
providing the content item to the target entity based on the determined security policy and the privacy policy for the target entity.

18. The apparatus of claim 17, wherein the processor is configured to perform the detecting includes one or more of:
generating the content item at the computing device;
receiving the content item at the computing device; or
detecting the content item at a peripheral device accessible by the computing device.

19. The apparatus of claim 17, wherein while providing the content item to the target entity, the processor is further configured to perform:

providing, to the local user, a dissemination plan that indicates one or more target entities;

receiving a response from the local user to the dissemination plan; and providing the content item to the target entities responsive to determining from the response that the local user accepts the dissemination plan.

20. The apparatus of claim 19, wherein the response indicates one or more of:

a target entity to remove from the dissemination plan;

a target entity to add to the dissemination plan;

a security policy for a target entity of the dissemination plan;

a privacy policy for a target entity of the dissemination plan; or a user-confirmation indicating that the local user accepts the dissemination plan.

\* \* \* \* \*